United States Patent
Al-Banna et al.

(10) Patent No.: US 11,917,259 B2
(45) Date of Patent: Feb. 27, 2024

(54) NODE WITH RADIO FREQUENCY (RF) SWITCHING NETWORK AND CORRESPONDING METHODS FOR IDENTIFYING COUPLED CLIENT DEVICES

(71) Applicant: ARRIS Enterprises LLC, Suwanee, GA (US)

(72) Inventors: Ayham Al-Banna, Orland Park, IL (US); Michael J. Emmendorfer, Chesterfield, MO (US); William Turner Hanks, Carol Stream, IL (US); Thomas J. Cloonan, Lisle, IL (US); Stephen W. Sanders, Hinckley, IL (US); Chris R. Zettinger, Wheaton, IL (US)

(73) Assignee: ARRIS Enterprises LLC, Suwanee, GA (US)

(*) Notice: Subject to any disclaimer, the term of this patent is extended or adjusted under 35 U.S.C. 154(b) by 211 days.

(21) Appl. No.: 16/952,881

(22) Filed: Nov. 19, 2020

(65) Prior Publication Data
US 2021/0160585 A1    May 27, 2021

Related U.S. Application Data

(60) Provisional application No. 62/938,825, filed on Nov. 21, 2019.

(51) Int. Cl.
*H04N 21/61* (2011.01)

(52) U.S. Cl.
CPC ..... *H04N 21/6168* (2013.01); *H04N 21/6118* (2013.01)

(58) Field of Classification Search
CPC ........... H04N 21/6118; H04N 21/6168; H04N 21/2408; H04N 21/25
USPC ......................................................... 375/222
See application file for complete search history.

(56) References Cited

U.S. PATENT DOCUMENTS

| | | | |
|---|---|---|---|
| 6,954,457 B2* | 10/2005 | Li | H04L 45/00 370/388 |
| 2009/0282446 A1 | 11/2009 | Breed et al. | |
| 2010/0183306 A1 | 7/2010 | Pangrac et al. | |
| 2010/0317387 A1 | 12/2010 | O'Keeffe et al. | |
| 2017/0019347 A1* | 1/2017 | Al-Banna | H04L 27/34 |

(Continued)

FOREIGN PATENT DOCUMENTS

CN    207603832 U    7/2018

OTHER PUBLICATIONS

International Search Report and Written Opinion Re: Application No. PCT/US2020/061328 (dated Feb. 24, 2021).

*Primary Examiner* — Dominic D Saltarelli
(74) *Attorney, Agent, or Firm* — Chernoff, Vilhauer, McClung & Stenzel, LLP

(57) ABSTRACT

A Data Over Cable Interface Specification (DOCSIS) node includes a first DOCSIS port and a second DOCSIS port. The node also includes a plurality of radio frequency (RF) ports. A plurality of client devices can be coupled to the RF ports. A RF switching network is coupled between the first DOCSIS port and the second DOCSIS port, and the plurality of RF ports. One or more control circuits can switch the RF switching network between at least a first state and a second state. The switching of the RF switching network allows the one or more control circuits to identify which client devices are coupled to which RF ports of the node.

7 Claims, 10 Drawing Sheets

(56) References Cited

U.S. PATENT DOCUMENTS

2017/0116021 A1* 4/2017 Miller .................... H04L 41/12
2018/0288829 A1* 10/2018 Palle ................... H04L 67/1001
2020/0021874 A1* 1/2020 Blanton ................ H04L 27/144

* cited by examiner

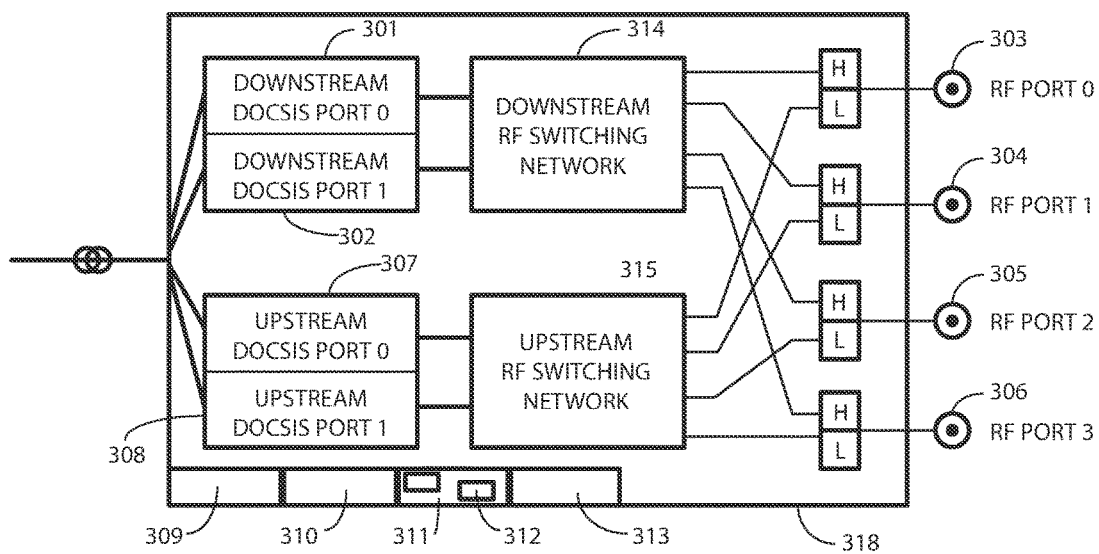
FIG. 3
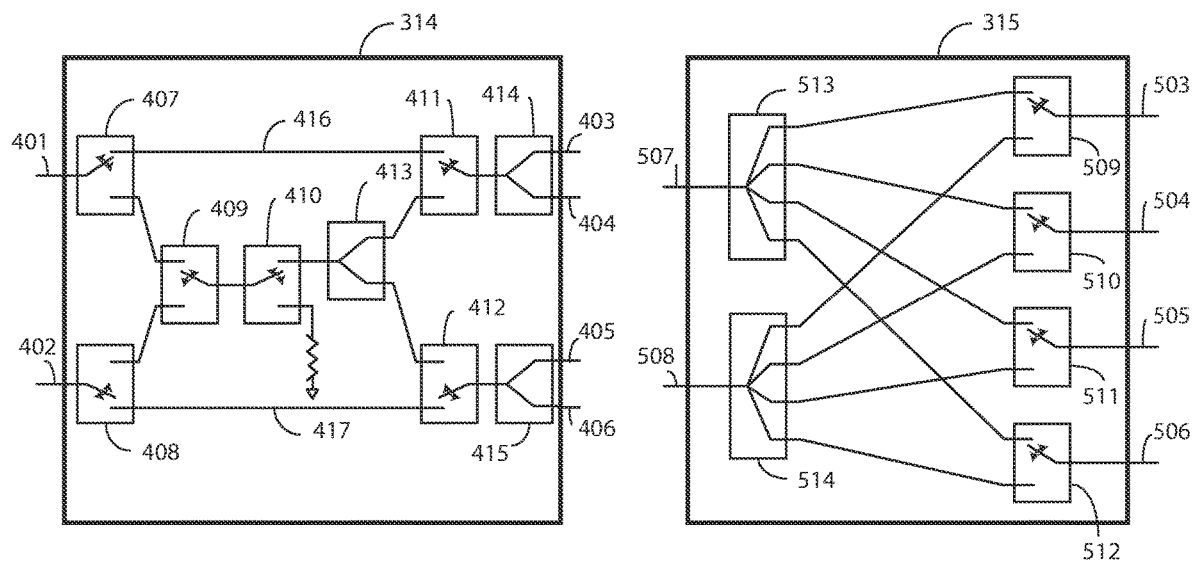
FIG. 4
FIG. 5

NODE WITH RADIO FREQUENCY (RF) SWITCHING NETWORK AND CORRESPONDING METHODS FOR IDENTIFYING COUPLED CLIENT DEVICES

CROSS REFERENCE TO RELATED APPLICATIONS

This application claims the benefit of U.S. Provisional Patent Application No. 62/938,825 filed Nov. 21, 2019.

BACKGROUND

Content delivery systems, including those used by cable television providers, deliver content such as video, audio, voice, data, and other content across a network to client devices. Frequently, this content is delivered from a "head-end" or "hub" device across the network to the client device. Where these systems offer data connection services such as interactive video, telephony services, and high-speed data for Internet and World Wide Web communications, fast data connections and high data bandwidths can be beneficial. One way to achieve these higher bandwidths is by using fiber optic cables. Fiber optic cables are capable of carrying orders of magnitude more data than are older electrical connections, such as coaxial cables.

Since fiber optic cable installations are expensive, it can be cost prohibitive, using current pricing models, to fully convert the legacy coaxial cable networks serving thousands of subscribers to optical networks. For this reason, many systems employ a "hybrid fiber coax" or "HFC" system that allows a service provider to connect client devices of end users served by coaxial cables with "head-end" or "hub" devices that deliver data through fiber optic cables in a cost effective manner. In an HFC system, centrally disposed components such as network head ends, hub devices, servers, and so forth deliver and receive data to and from the network using fiber optic cables. Termination points, i.e., customers and their corresponding client devices, are served by coaxial cables.

To bridge between the fiber optic cables and the coaxial cables, a "node" module is used. This "node" is a device that receives optical signals via a fiber optic network, converts those signals to radio frequency (RF) signals, and delivers RF signals via a coaxial cable network. Accordingly, optical node modules receive data via optical fibers at one or more downstream ports, convert that data to RF signals, and deliver those RF signals to legacy coaxial networks at one or more RF ports.

The Data Over Cable Interface Specification (DOCSIS) is one standard among many that supports such modular systems. One way to achieve the modularity described above is to separate the DOCSIS media access control (MAC) functionality from the DOCSIS physical layer (PHY) functionality into two different boxes. In a DOCSIS network using a Remote PHY architecture, the Integrated Converged Cable Access Platform (I-CCAP) is separated with the CCAP core situated in the head-end and the remote PHY device (RPD) situated at the node. Where the node has multiple RF ports, it is difficult or impossible to determine which client devices are being served by which RF ports. It would be advantageous to have an improved node architecture that allowed for such determinations to be made.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 3 illustrates a schematic block diagram of one explanatory node in accordance with one or more embodiments of the disclosure.

FIG. 4 illustrates one explanatory downstream RF switching network in accordance with one or more embodiments of the disclosure.

FIG. 5 illustrates one explanatory upstream RF switching network in accordance with one or more embodiments of the disclosure.

Figure 1:
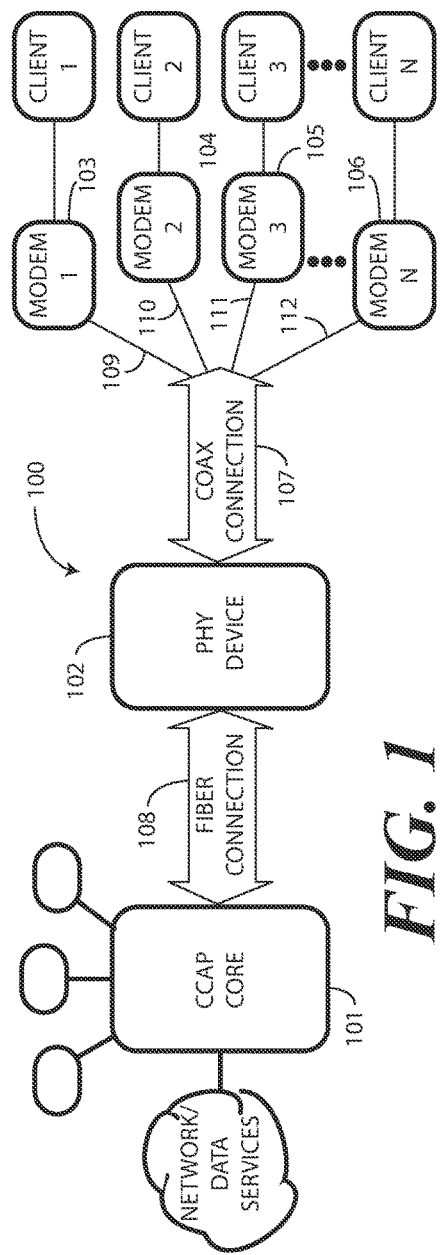
FIG. 1 illustrates a prior art remote PHY system architecture.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting which client devices are being served by which RF ports of nodes in a remote PHY system. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of detecting which client devices are being served by which RF ports of nodes as described herein. The non-processor circuits may include, but are not limited to, a radio receiver, a radio transmitter, signal drivers, clock circuits, power source circuits, and user input devices. As such, these functions may be interpreted as steps of a method to perform a detection process identifying which client devices are being served by which RF ports of a node. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Turning now to FIG. 1, illustrated therein is a prior art remote PHY architecture 100. Remote PHY refers to the technique of moving the PHY circuit out of a device such as a CCAP and putting the PHY circuit at the end of a network in another device, such as a node. Remote PHY builds upon the work started with the modular cable modem termination system (CMTS) (M-CMTS) and Modular Headend Architecture (MHA) at CableLabs.

In Remote PHY Architectures, the classic I-CCAP is separated into two distinct components. The first component is the CCAP Core 101. This component is generally situated at a head-end server. The second component is the remote PHY device (RPD) 102. This component is generally situated at a node that is located closer to the client devices 103,104,105,106 served by the node across a RF network 107, which is frequently comprised of coaxial cables. Data communications between the CCAP core 101 and the RPD 102 occur across a fiber optic cable network, shown here as a passive optical network 108 or (PON), to provide higher bandwidth.

The CCAP core 101 includes both a CMTS core for DOCSIS and an edge quadrature amplitude modulator (EQAM) core for video. The CMTS core contains the DOCSIS media access control (MAC) and the upper layer DOCSIS protocols. This includes all signaling functions, downstream and upstream bandwidth scheduling, and DOCSIS framing. The DOCSIS functionality of the CMTS core is defined by the existing DOCSIS Specifications. The EQAM core contains all the video processing functions that an EQAM provides today.

The RPD 102 includes mainly PHY related circuitry, such as downstream QAM modulators, upstream QAM demodulators, together with pseudo-wire logic to connect to the CCAP core 101. The RPD platform is a physical layer converter whose functions include both converting downstream DOCSIS, Moving Picture Experts Group (MPEG) video and out of band (OOB) signals received from a CCAP core 101 over a digital medium such as Ethernet or PON 108 to analog for transmission over RF via the RF network 107 or other equivalent network and/or converting upstream DOCSIS and OOB signals received from an analog medium such as RF or linear optics to digital for transmission over Ethernet or PON 108 to the CCAP core 101.

The RPD 102 has one of more RF ports 109,110,111,112 providing connectivity to the client devices 103,104,105,106 belonging to customers of the system. It is not possible using the prior art remote PHY architecture 100 to determine which client devices 103,104,105,106 are being served by which RF ports 109,110,111,112. The same is true with remote media access control PHY (RMACPHY) devices (RMDs). This deficiency is incredibly problematic, as the "legs" of the RF network 107 can run significant distances. Additionally, event correlations of groups of customers impacted by an outage occurring on a leg of the RF network 107 cannot occur. If something happens to one leg of the RF network 107 in the prior art remote PHY architecture 100, the only way to figure out which leg is experiencing trouble is to put a man in a truck and have him drive each leg looking for problems. This is time consuming, expensive, and results in very unhappy customers.

Advantageously, embodiments of the disclosure provide methods and systems that are able to identify which client devices are being served by which RF ports of RPDs or MACPHYs. Embodiments of the disclosure allow users of remote PHY systems configured in accordance with embodiments of the disclosure, which may include large cable companies known generally as multiple system operators (MSOs) who operate several cable communication systems (in some cases up to hundreds of systems) a verifiable and continuous method to determine which client devices are being served by each RPD or node. Moreover, embodiments of the disclosure allow the MSOs to determine which client devices are being served by each RF port, thereby identifying to which leg of an RF network any one client device is coupled.

Embodiments of the disclosure contemplate that connectivity between RF ports of RPDs and the associated client devices can get stale. For this and other reasons, these records can be incorrect. Additionally, new records for new client devices are often entered manually, thereby compounding the error rate. When "node splits" are performed due to the fact that additional nodes or RPDs are required to serve the base of client devices, the records can become even more inaccurate.

Advantageously, embodiments of the disclosure provide methods and systems that can be used to determine, during the installation process, whether an RPD or RMD was correctly wired to the RF tray of the node. Embodiments of the disclosure provide MSOs with the ability to obtain current network topologies for client devices being served by an RPD RF port and corresponding RF leg of an RF network.

In one or more embodiments, an RPD, RMD, or node is equipped with an RF switching network coupled between the upstream DOCSIS port, which can be an optical port, and the downstream RF port. As will be shown in more detail below, the RF switching network can be coupled on the downstream path or the upstream path. In other embodiments, RF switching networks can be coupled in both the downstream path and the upstream path. In one or more embodiments, one or more control circuits operable with the RF switching networks control the RF switching networks during the DOCSIS initialization procedure to determine which client devices are coupled to which RF ports of the RPD, RMD, or node.

In one or more embodiments, the one or more control circuits allow the client devices attached to the RF ports of the RPD, RMD, or node to complete the ranging and registration operation while the RF switching network(s) are in an initial, or default, configuration. Thereafter, the one or more control circuits cause the RF switching network(s) to change to a different configuration. In one or more embodiments, the one or more control circuits, or optionally one or more processors operable with the RPD, RMD, or node, determine which client devices are still identified as having completed the ranging and registration procedure. These client devices can be recorded and stored in memory.

Next, the one or more control circuits can cause the RF switching network(s) to change to yet another configuration. This causes the client devices that could not be contacted previously to be coupled to other DOCSIS ports, thereby allowing these devices to again be identified. This process can continue for all permutations of ports so that every client device coupled to the RF ports of a RPD, RMD, or node can be identified as being coupled to a particular RF port and corresponding RF leg of the RF network.

In one or more embodiments, to avoid service interruptions caused when client devices must restart and re-register with a head-end, this process can be performed using other techniques that do not disrupt service to any of the client devices. Illustrating by example, in one or more embodiments a subset of client devices can be instructed to transmit data during a test period. Examples of such instructions include causing the client devices coupled to the remaining RF port to deliver station maintenance, transmit DOCSIS code words (CW), transmit pilot transmission probes such as the D3.1 probe, and so forth. Meanwhile, the remaining client devices, i.e., the set that comprises the complement of the subset, can be assigned idle grants during the test period.

In one or more embodiments, the one or more control circuits cause the RF switching network(s) to switch between the various RF ports and DOCSIS ports while the subset of client device are transmitting data and client devices other than those in the subset are silent. In so doing, the burst receiver of the head-end can identify the RF port and corresponding RF leg to which the client devices are coupled. These tests can be performed periodically and/or staggered across time to periodically update the status of the system. They do not have to be performed for all client devices back-to-back, thereby increasing the probability that no service disruptions will occur.

In one or more embodiments, a DOCSIS node comprises a first DOCSIS port and a second DOCSIS port. The node can further include a plurality of RF ports and an RF switching network coupled between the first DOCSIS port and the second DOCSIS port and the plurality of RF ports.

In one or more embodiments, a method for identifying which client devices are coupled to which RF ports of the node includes assigning, with one or more control circuits, some of the client devices coupled to the node instructions to transmit data. In one or more embodiments, the method comprises assigning, with the one or more control circuits, others of the client devices idle grants. In one or more embodiments, when one or more control circuits switch an RF switching network situated between the RF ports and a plurality of optical ports of the node from a first state to a second state, the one or more control circuits identify one or more client devices of the some of the client devices that are delivering the data to a predefined optical port of the plurality of optical ports.

Embodiments of the disclosure contemplate that node splits, node replacement, and other field operations will continue to occur as MSOs work to increase bandwidth in their RPD systems. Advantageously, embodiments of the disclosure provide a simple, effective, and low-cost tool to determine which client devices are served by which RF leg of an RF network. Embodiments of the disclosure also allow MSO operational groups to determine accurate event correlation of customers impacted by outages occurring on an RF leg. Moreover, embodiments of the disclosure allow MSOs to identify which RF leg coupled to an RF port of a RPD, RMD, or node is experiencing technical problems. Embodiments of the disclosure further allow MSOs to determine the number of client devices served by each RF leg so that they may rebalance service groups in the DOCSIS system.

Embodiments of the disclosure differ from prior art systems such as those shown in FIG. 1 because previous solutions have never implemented RF switching network(s) that provide the flexibility to configure the connectivity between RF ports of a RPD, RMD, or node and the DOCSIS ports. For this reason, prior art solutions are incapable of determining which client devices are served by each RF leg of the RPD, RMD, or node. Embodiments of the disclosure also differ from prior art solutions in that some embodiments of the disclosure leverage the DOCSIS initialization procedure to uniquely determine the connectivity of client devices to specific DOCSIS and RF ports of a RPD, RMD, or node to precisely identify the system topology, as well as the client devices and corresponding customers served by each RF leg of the RPD, RMD, or node.

Figure 2:
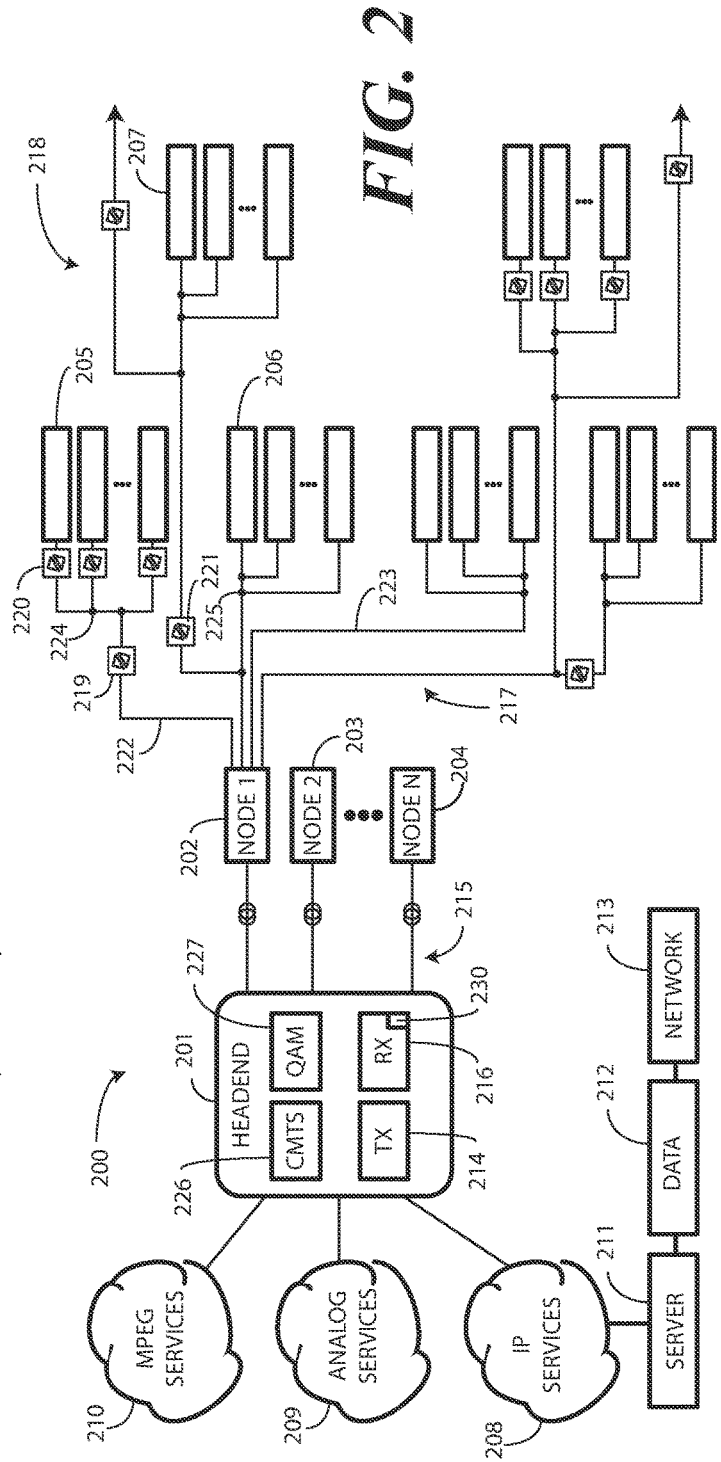
FIG. 2 illustrates one explanatory remote PHY system in accordance with one or more embodiments of the disclosure.

Turning now to FIG. 2, illustrated therein is one explanatory remote PHY system 200 configured in accordance with one or more embodiments of the disclosure. The remote PHY system 200 can be used to deliver high-definition digital entertainment and telecommunications such as video, voice, and high-speed Internet services to one or more client devices, e.g., client devices 205,206,207.

In one or more embodiments, the remote PHY system 200 represents the operational or geographical footprint of an entertainment and/or information services franchise that provides entertainment and/or information services to a subscriber base spanning one or more towns, a region, or a portion thereof. Particular entertainment and/or information services offered by the franchise, such as an entertainment channel lineup, data packages, or other services, may differ from system to system. Where, for example, a large cable company operates multiple cable communication systems they are generally referred to as a MSO.

It should be noted while an HFC network will be used as an illustrative configuration of a remote PHY system 200 for explanatory purposes, embodiments of the disclosure are not so limited. Embodiments of the disclosure can be used with other network topologies as well, including all-coax networks, all fiber networks, fiber to the last amplifier (FTTA) networks, or other networks. Moreover, while a remote PHY system 200 using the DOCSIS protocol will be used as an illustrative example, embodiments of the disclosure can be used with other types of devices where a head-end 201, server, or other device is physically separated from a node 202 or nodes 202,203,204 serving one or more client devices 205,206,207, regardless of whether the DOCSIS protocols are being used.

In the illustrative embodiment of FIG. 2, the remote PHY system 200 comprises an HFC network that combines optical fiber and coaxial cable. In one or more embodiments, this combination advantageously places placing fiber nodes to provide services to a plurality of homes. It should be understood that the systems and methods disclosed in the present application may be employed in various networks and the HFC network is merely shown as a non-limiting example.

In one or more embodiments, the remote PHY system 200 comprises a head-end 201 that receives analog video signals and digital bit streams representing different services, such as video services, voice services, Internet services, or other services, from various digital information sources. For example, the head-end 201 may receive content from one or more video-on-demand (VOD) servers, Internet protocol television (IPTV) broadcast video servers, Internet video sources, or other suitable sources for providing Internet protocol (IP) content.

In one or more embodiments, the remote PHY system 200 comprises an IP network 208, MPEG services 209, and analog services 210. The IP network 208 includes web server 211 and a data source 212. The web server 211 can comprise a streaming server that uses the IP protocol to deliver video-on-demand, audio-on-demand, and pay-per view streams to the IP network 208. The IP data source 212 may be connected to a regional area or backbone network 213 that transmits IP content. For example, the regional area network can be or include the Internet or an IP-based network, a computer network, a web-based network or other suitable wired or wireless network or network system.

In one or more embodiments, the various services are encoded, modulated and up-converted onto RF carriers, combined onto a single electrical signal and inserted into a broadband optical transmitter 214 (denoted with the symbol Tx in FIG. 1) at the head-end 201. A fiber optic network 215 extends from the cable operator's master/regional head-end 201 to a plurality of nodes 202,203,204, which in this illustrative example are configured as RPDs. The nodes 202,203,204 may be RMDs or other types of devices in other architectural systems.

In one or more embodiments, the head-end 201 may contain an optical transceiver, which can include one or more of the optical transmitter 214 and an optical receiver 216 (denoted with the symbol Rx in FIG. 1) to send and receive optical communications through the fiber optic network 215. In one or more embodiments, the optical receiver 216 functions as, or comprises, a burst receiver 230. As will be described in more detail below, in one or more embodiments the burst receiver 230 can be configured to determine which client devices 205,206,207 are delivering data to DOCSIS ports of the nodes 202,203,204. In one or more embodiments, the burst receiver 230 accepts upstream burst data received from the nodes 202,203,204,205 across the fiber optic network 215. Regional headends and/or neighborhood hub sites may also exist between the head-end 201 and one or more nodes 202,203,204 in other embodiments.

In one or more embodiments, the fiber optic network 215 extends from the head-end 201 to the regional headend/hub (where included) and/or to the plurality of nodes 202,203, 204. The optical transmitter 214 converts the electrical signal to a downstream optically modulated signal that is sent to the nodes 202,203,204. In turn, the nodes 202,203, 204 convert inbound signals to RF energy for delivery to the client devices 205,206,207.

In the return path, the nodes 202,203,204 convert return RF signals to optical signals and send the optical signals through the fiber optic network 215 to optical receiver 216, which can convert the optical signals back to electrical signals. In one or more embodiments, each node 202,203, 204 functions as a local digital hub that transports local requests over the optical fibers of the fiber optic network 215 and back to the client devices 205,206,207 via an RF network 217, which in this illustration comprises a plurality of coaxial cables.

As used herein, the terms "forward path" and "downstream" may be interchangeably used to refer to a path from a head-end 201 to a node 202,203,204, from a node 202, 203,204 to a client device 205,206,207 or subscriber, or from a head-end 201 to a subscriber. Conversely, the terms "return path," "reverse path" and "upstream" may be interchangeably used to refer to a path from a subscriber or client device 205,206,207 to a node 202,203,204, a node 202,203, 204 to a head-end 201, or a subscriber or client device 205,206,207 to a head-end 201.

Additionally, it should be noted that the node 202,203,204 may be any analog or digital hub situated between a head-end 201 and a client device 205,206,207 that transports local requests over the system, be it a remote PHY system 200 or other type of system. Forward path optical communications over the fiber optic network 215 may be converted at the nodes 202,203,204 to RF communications for transmission over the RF network 217 to the client devices 205,206,207. Conversely, return path RF communications from the client devices 205,206,207 are provided over the RF network 217 and are typically converted at a node 202,203,204 to optical signals for transmission over the fiber optic network 215 to the head-end 201. Each node 202,203,204 may contain a return path transmitter that is able to relay communications upstream from a client device 205,206,207 to the head-end 201.

In one or more embodiments, each node 202,203,204 serves a service group, e.g., service group 218, which comprises one or more client devices 205,206,207 located at one or more customer locations. Illustrating by example, a single node, e.g., node 202, may be connected to thousands of client devices 205,206,207, such as cable modems or other network elements including bidirectional RF amplifiers. In one illustrative embodiment example, node 202 serves anywhere from one to two thousand customer locations. In an HFC network, the node 202 may be connected to a plurality of client devices 205,206,207 via coaxial cables or other conduits of the RF network 217. Alternatively, the node 202 may be coupled to the client devices 205,206,207 by a combined fiber optic/coaxial cable network. Other network connections suitable for coupling the node 202 to the client devices 205,206,207 will be obvious to those of ordinary skill in the art having the benefit of this disclosure.

In one or more embodiments, each node 202,203,204 may include a broadband optical receiver to convert the downstream optically modulated signal received from the head-end 201 or hub to an electrical signal for provision to the client devices 205,206,207 via the RF network 217 of the HFC network. Each node 202,203,204 may be connected to many client devices 205,206,207 via a coaxial cable portion of the RF network 217 referred to as an "RF cascade." In one or more embodiments, signals may pass from the nodes 202,203,204 to the client devices 205,206,207 via the RF cascade, which may comprise one or more amplifiers, e.g., amplifiers 219,220,221. The RF cascade may further include other active or passive devices such as cabling, taps, splitters, and in-line equalizers. Some RF legs of the RF network 217, e.g., RF leg 222, client devices 205 may be connected via amplifiers 219,220. Other RF legs, e.g., RF leg 223, may not include amplifiers such that the client devices 206 do not receive amplified signals. Each client device 205,206,207 can be coupled to the RF legs 222,223 of the RF network 217 via one or more taps, e.g., taps 224,225. Taps are designed in various values to allow amplitude consistency along the distribution system.

In one or more embodiments, the client devices 205,206, 207 reside at a customer location, such as a home of a subscriber to the system. In one or more embodiments, the client devices 205,206,207 are connected to the cable modem termination system (CMTS) 226 or comparable component located in a head-end 201. Each client device 205,206,207 may be a modem, e.g., cable modem, a media terminal adaptor (MTA), a set top box, a terminal device, a television equipped with set top box, a DOCSIS terminal device, customer premises equipment (CPE), a router, or like electronic client, end, or terminal devices of subscribers. For example, in one or more embodiments the client devices 205,206,207 comprise cable modems or IP set top boxes that support data connection to the Internet and other computer networks via the cable network, and the cable network provides bi-directional communication systems in which data can be sent downstream from the head-end 201 to a subscriber and upstream from a subscriber to the head-end 201.

The techniques disclosed herein may be applied to systems compliant with DOCSIS. The cable industry developed the international DOCSIS standard or protocol to enable the delivery of IP data packets over cable systems. In general, DOCSIS defines the communications and operations support interface requirements for a data over cable system. For example, DOCIS defines the interface requirements for cable modems involved in high-speed data distribution over cable television system networks. However, it should be understood that the techniques disclosed herein may apply to any system for digital services transmission, such as digital video or Ethernet PON over Coax (EPOC). Examples herein referring to DOCSIS are illustrative and representative of the application of the techniques to a broad range of services carried over coax.

In one or more embodiments, the CMTS 226 at the head-end 201 comprises a component that exchanges signals between the head-end 201 and the client devices 205,206, 207. In one or more embodiments, for example, the CMTS 226 and the client devices 205,206,207 may be the endpoints of the DOCSIS protocol, with remote PHY system 200 transmitting information between these endpoints. It will be appreciated that remote PHY system 200 includes one CMTS 226 for illustration clarity only, as it is customary that multiple CMTSes and their connected user deices are managed in a remote PHY system 200 in many embodiments.

In one or more embodiments, the CMTS 226 hosts downstream and upstream ports and contains numerous receivers, with each receiver handling communications between hundreds of client devices 205,206,207 connected to the head-end 201. For example, each receiver of the CMTS 226 may be connected to several client devices 205,206,207 of many subscribers. Said differently, a single receiver of the CMTS 226 may be connected to hundreds of client devices 205,206,207, which can each vary widely in communication characteristics. In many instances several nodes 202,203,204 may serve a particular area of a town or city. DOCSIS enables IP packets to pass between devices on either side of the link between the CMTS 226 and the client devices 205,206,207.

It should be understood that the CMTS 226 is but one example of a component in the head-end 201 that may be used to exchange signals between the head-end 201 and the client devices 205,206,207. In other embodiments, a modular CMTS (M-CMTSTM) architecture or a CCAP can function similarly to the CMTS 226, providing a more efficient handling of traffic via the use of IP routing to replace significant combining, splitting, and cabling components in the CMTS 226. Thus, the CCAP design may improve the efficiency of the CMTS design, improving operations, head-end maintenance, and equipment life cycles. The CCAP version of the CMTS 226 may utilize less rack space in the head-end 201 and lower power consumption.

A quadrature amplitude modulator (QAM) 227 may be in the head-end 201 or hub device for receiving packets of digital content, such as video or data, re-packetizing the digital content into an MPEG transport stream, and digitally modulating the digital transport stream onto a downstream RF carrier using quadrature amplitude modulation. QAMs may be used for both digital broadcast, and DOCSIS downstream transmission. In CMTS or M-CMTS implementations, data and video QAMs may be implemented on separately managed and controlled platforms. In CCAP implementations, the CMTS and edge QAM functionality may be combined in one hardware solution, thereby combining data and video delivery.

In this illustrative remote PHY system 200, the DOCSIS MAC and PHY layers are moved out of the head-end 201 and are instead incorporated into each node 202,203,204. In some R-CCAP implementations, the entire upper and lower MAC and PHY layer functions are moved to the nodes 202,203,204, placing the CMTS, QAM, and CCAP functions into the nodes 202,203,204. When the QAM 227 is physically removed from an integrated CMTS 226 and placed downstream it is known as an edge QAM (EQAM) or downstream PHY device. In some remote node embodiments, the nodes 202,203,204 are configured as RPDs, where the physical layer links a layer device, such as a MAC layer, to a physical medium, such as an optical fiber or copper cable. In remote PHY systems such as that shown in FIG. 2, the CCAP MAC remains in the head-end 201 and ethernet aggregation is performed by the head-end 201.

Turning now to FIG. 3, illustrated therein is one explanatory node 202 configured in accordance with one or more embodiments of the disclosure. As previously described, in one or more embodiments the node 202, in the down stream direction, receives optical signals via a fiber optic network (215) and converts those signals to RF signals. The node 202 then delivers RF signals via an RF network (217), which comprises a coaxial cable network in one or more embodiments. In the illustrative embodiment of FIG. 3, the node 202 receives data via optical fibers at a first downstream DOCSIS port 301 and a second downstream DOCSIS port 302, each of which is an optical port. The node 202 convert that data to RF signals and delivers those RF signals to four RF ports 303,304,305,306 coupled by an RF network (217) to one or more client devices (205,206,207). As shown above in FIG. 2, each client device is coupled to a single RF port of the node 202. For example, client device (205) was coupled to RF port 303 in FIG. 2, while client devices (206,207) were coupled to RF port 304, and so forth.

In the upstream direction, the node 202 receives RF signals from the client device (205,206,207) at the RF ports 303,304,305,306. The node 202 converts those signals to optical signals and then delivers the optical signals to a first upstream DOCSIS port 307 and a second upstream DOCSIS port 308, each of which is an optical port. The optical signals are then delivered from the first upstream DOCSIS port 307 and the second upstream DOCSIS port 308 to the head-end (201) across the fiber optic network (215).

To ensure the reliability of the components of the node 202, these electronic components are generally placed in a housing 318. Since the housing is sometimes exposed to the elements, it generally needs to be weatherproof. Frequently, the housing 318 is physically configured as a "trunk." The trunk can include a lid that is pivotably coupled to a base by one or more hinges. In one or more embodiments, the housing 318 includes one or more apertures configured as physical "ports" through which electrical connections to the first downstream DOCSIS port 301, the second downstream DOCSIS port 302, the first RF port 303, the second RF port 304, the third RF port 305, the fourth RF port 306, the first upstream DOCSIS port 307, and the second upstream DOCSIS port 308 can be made from exterior of the housing 318.

In one or more embodiments, the node 202 includes one or more electronic components situated within the housing 318. The electronic components situated within the housing 318 can include power supplies, RF amplifiers, power distribution boards, fiber optic receiver modules, digital transmitters, one or more processors, or other associated components. For example, in one or more embodiments the node includes a quad-output amplifier module 309, a power supply 310 operable with the quad-output amplifier module 309, a control board 311 comprising one or more control circuits 312, and a node/amplifier determination module 313. These electronic components are illustrative only. Those of ordinary skill in the art having the benefit of this disclosure will understand that other configurations may be more suitable for other applications.

In one or more embodiments, the node 202 includes a downstream RF switching network 314 coupled between the DOCSIS ports and the RF ports. In the illustrative example of FIG. 3, the downstream RF switching network 314 is coupled the first downstream DOCSIS port 301 and the second downstream DOCSIS port 302, and the RF ports 303,304,305,306. In one or more embodiments, the downstream RF switching network 314 allows the one or more control circuits 312 of the control board 311 to switch the connections between the first downstream DOCSIS port 301 and the second downstream DOCSIS port 302 and the RF ports 303,304,305,306 during operation. Illustrating by example, a connection between the first downstream DOCSIS port 301 and the first RF port 303 can be disconnected, with another connection between the second downstream DOCSIS port 302 and the first RF port 303 being made, simply by switching the downstream RF switching network 314.

Turning briefly to FIG. 4, illustrated therein is a schematic block diagram of one embodiment of the downstream RF switching network 314. As shown in FIG. 4, the downstream RF switching network 314 includes two input connections 401,402 and four output connections 403,404,405,406. In one or more embodiments, the first input connection 401 is coupled to the first downstream DOCSIS port (301), while the second input connection 402 is coupled to the second downstream DOCSIS port (302). The first output connection 403 is coupled to the first RF port (303), while the second output connection 404 is coupled to the second RF port (304). The third output connection 405 is coupled to the third RF port (305), while the fourth output connection 406 is coupled to the fourth RF port (306), and so forth.

Coupled between the two input connections 401,402 and four output connections 403,404,405,406 are a network of terminated single pole, double throw (SPDT) switches 407, 408,409,410,411,412 and signal splitters 413,414,415. By altering the state of the SPDT switches 407,408,409,410, 411,412, the one or more control circuits (312) of a node (202) can cause either the first input connection 401 or the second input connection 402 to be coupled to different combinations of the output connections 403,404,405,406.

Illustrating by example, causing SPDT 407 and SPDT 411 to couple to connector 416 causes the first input connection 401 to be connected to the first output connection 403 and the second output connection 404. By contrast, connecting SPDT 407 to SPDT 409, with SPDT 410 coupled to signal splitter 413, with both SPDT 411 and SPDT 412 coupled to signal splitter 413 causes the first input connection 401 to be coupled to all four output connections 403,404,405,406.

Similarly, causing SPDT 408 and SPDT 415 to couple to connector 417 causes the second input connection 402 to be connected to the third output connection 405 and the fourth output connection 406. By contrast, connecting SPDT 408 to SPDT 409, with SPDT 410 coupled to signal splitter 413, with both SPDT 411 and SPDT 412 coupled to signal splitter 413 causes the second input connection 402 to be coupled to all four output connections 403,404,405,406, and so forth.

It should be noted that the downstream RF switching network 314 of FIG. 4 is one explanatory example of how a downstream RF switching network can be configured in accordance with embodiments of the disclosure to allow for switching connections between the input connections 401, 402 and the output connections 403,404,405,406. Other configurations, including those using other types of switches, will be obvious to those of ordinary skill in the art having the benefit of this disclosure.

Turning now back to FIG. 3, the one or more control circuits 312 of the control board 311 can switch the downstream RF switching network 314 to a first state. In the first state, the first downstream DOCSIS port 301 is connected to the first RF port 303 and the second RF port 304, while the second downstream DOCSIS port 302 is coupled to the third RF port 305 and the fourth RF port 306. The one or more control circuits 312 can alternatively switch the downstream RF switching network 314 to a second state in which the first downstream DOCSIS port 301 is coupled to all of the RF ports 303,304,305,306. Similarly, the one or more control circuits 312 of the control board 311 can switch the downstream RF switching network 314 to a third state in which the second downstream DOCSIS port 302 is connected to all of the RF ports 303,304,305,306.

In one or more embodiments, the node 202 also includes an upstream RF switching network 315 that is also coupled between the DOCSIS ports and the RF ports. In the illustrative example of FIG. 3, the upstream RF switching network 315 is coupled the first upstream DOCSIS port 307 and the second upstream DOCSIS port 308, and the RF ports 303,304,305,306. As with the downstream RF switching network 314, in one or more embodiments, the upstream RF switching network 315 allows the one or more control circuits 312 of the control board 311 to switch the connections between the first upstream DOCSIS port 307 and the second upstream DOCSIS port 308 and the RF ports 303,304,305,306 during operation. Illustrating by example, a connection between the first upstream DOCSIS port 307 and the first RF port 303 can be disconnected, with another connection between the second upstream DOCSIS port 308 and the first RF port 303 being made, simply by switching the state of the upstream RF switching network 315.

Turning briefly to FIG. 5, illustrated therein is a schematic block diagram of one embodiment of the upstream RF switching network 315. As shown in FIG. 5, the upstream RF switching network 315 includes two output connections 507,508 and four input connections 503,504,505,506. In one or more embodiments, the first output connection 507 is coupled to the first upstream DOCSIS port (307), while the second output connection 508 is coupled to the second upstream DOCSIS port (308). In one or more embodiments, the first input connection 503 is coupled to the first RF port (303), while the second input connection 504 is coupled to the second RF port (304). The third input connection 505 is coupled to the third RF port (305), while the fourth input connection 506 is coupled to the fourth RF port (306), and so forth.

Coupled between the two output connections 507,508 and four input connections 503,504,505,506 are four SPDT switches 509,510,511,512 and two signal combiners 513, 514. By altering the state of the SPDT switches 509,510, 511,512, the one or more control circuits (312) of a node (202) can cause any of the input connections 503,504,505, 506 to be coupled to any of the output connections 507,508.

Illustrating by example, causing SPDT 509 to couple to signal combiner 513, while SPDT 510, SPDT 511, SPDT 512 are coupled to signal combiner 514 causes the first input connection 503 to couple to the first output connection 507 while input connection 504, input connection 505, and input connection 506 are coupled to the second output connection 508. Causing SPDT 509 and SPDT 510 to couple to signal combiner 513, while SPDT 511 and SPDT 512 are coupled to signal combiner 514 causes the first input connection 503 and the second input connection 504 to couple to the first output connection 507, while the third input connection 505 and the fourth input connection 506 are coupled to the second output connection 508, and so forth.

Turning now back to FIG. 3, the one or more control circuits 312 of the control board 311 can switch the upstream RF switching network 315 to four squared, or sixteen, different states. Illustrating by example, in a first state all RF ports 303,304,305,306 are coupled to the first upstream DOCSIS port 307. In a second state, RF port 303 is coupled to the first upstream DOCSIS port 307, while RF ports 304,305,306 are coupled to the second upstream DOCSIS port 308. In a third state, RF ports 303,304 are coupled to the first upstream DOCSIS port 307, while RF ports 305,306 are coupled to the second upstream DOCSIS port 308. In a fourth state, RF ports 303,304,305 are coupled to the first upstream DOCSIS port 307, while RF port 306 is coupled to the second upstream DOCSIS port 308, and so forth.

As will be shown in more detail below, by controlling the one or both of the downstream RF switching network 314 and/or the upstream RF switching network 315, the one or more control circuits 312 of the node 202 can, advantageously, identify which client devices are coupled to which RF port 303,304,305,306 of the node 202. This technique can further be used to determine at the time of installation whether the client devices are correctly coupled to the RF ports 303,304,305,306 as well. Without the techniques described below, event correlation of groups of client devices impacted during outages occurring at RF legs coupled to the RF ports 303,304,305,306 cannot be known. Advantageously, the techniques described below provide MSOs with the ability to obtain current network topology information for customers served by a particular RF port 303,304,305,306 and its corresponding RF leg.

Figure 6:
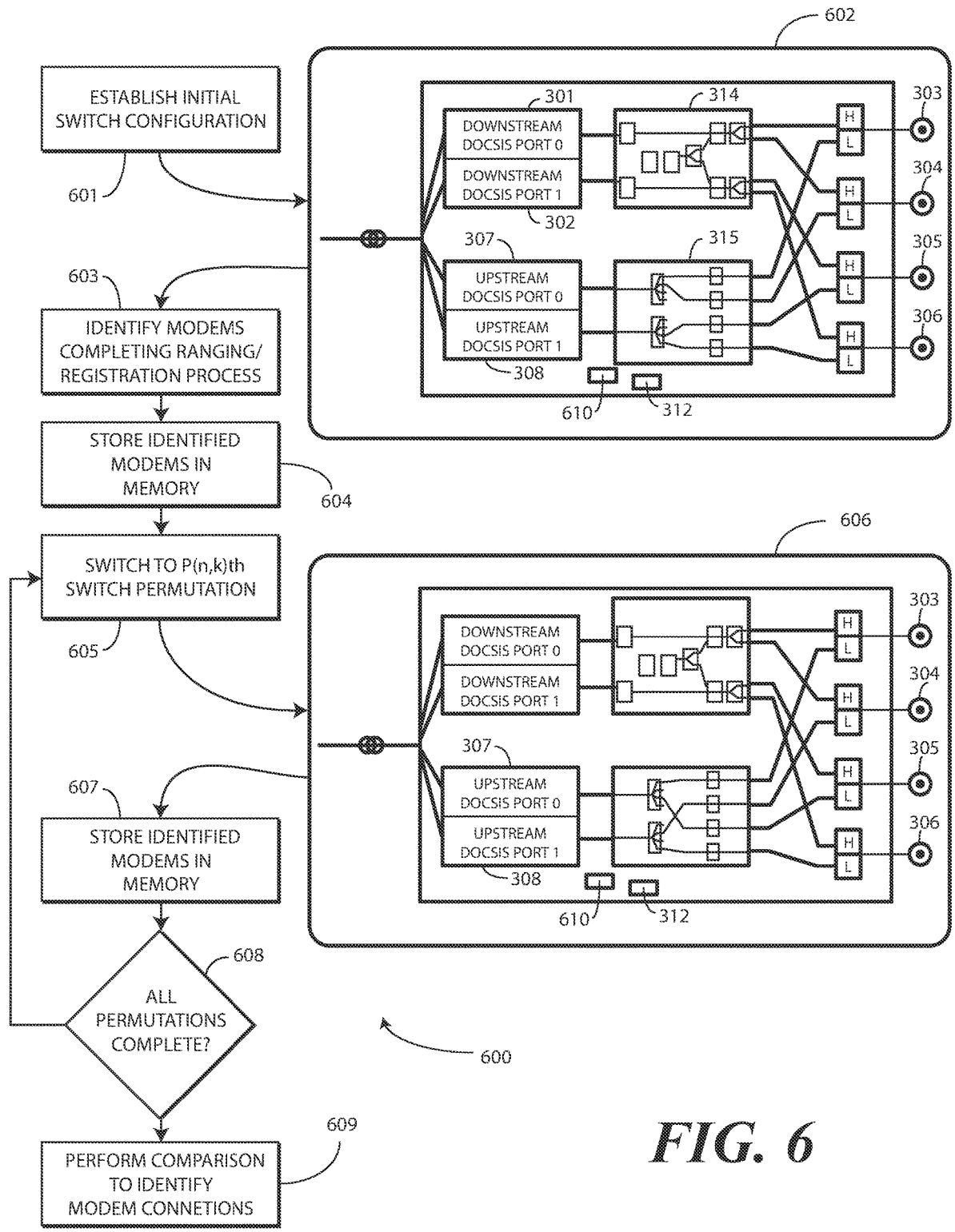
FIG. 6 illustrates one explanatory method in accordance with one or more embodiments of the disclosure.

Turning now to FIG. 6, illustrated therein is one explanatory method 600 configured in accordance with one or more embodiments of the disclosure. The method 600 of FIG. 6 leverages steps of switching the downstream RF switching network 314 and/or upstream RF switching network 315 with input from a DOCSIS initialization procedure to determine which client devices are coupled to which RF ports 303,304,305,306 of a DOCSIS node 202.

In one or more embodiments, the method 600 of FIG. 6 allows client devices coupled to the RF ports 303,304,305, 306 to complete their ranging and registration operations while one or both of the downstream RF switching network 314 and/or upstream RF switching network 315 are in a first state. In one or more embodiments, the method 600 then changes the state of one or both of the downstream RF switching network 314 and/or upstream RF switching network 315 to a second state. In this second state, one or more control circuits 312 of the node 202 determine which client devices are still identified as having completed the ranging and registration procedure. Client devices that are no longer in communication with the head-end or, alternatively, client devices that are now connected to other DOCSIS ports can be identified to determine which client devices are connected to which RF ports 303,304,305,306.

While the change in state can occur by causing one or both of the downstream RF switching network 314 and/or upstream RF switching network 315 to switch states, for ease of illustration the method 600 will be described in the form of changing the state of only the upstream RF switching network 315. However, it is to be understood that equivalents of the method 600 can be achieved by causing the downstream RF switching network 314 to change state while the upstream RF switching network 315 remains in a constant state. In still other embodiments, equivalents of the method 600 can be achieved by switching both the downstream RF switching network 314 and the upstream RF switching network 315 to different states. Thus, other equivalents to the method 600 of FIG. 6 will be obvious to those of ordinary skill in the art having the benefit of this disclosure.

Beginning at step 601, one or more control circuits 312 of a node cause the downstream RF switching network 314 and the upstream RF switching network 315 to enter a first state, which is shown at step 602. In this illustrative example, the first state comprises the first downstream DOCSIS port 301 to be coupled to the first RF port 303 and the second RF port 304. In this illustrative example, the first state also comprises the second downstream DOCSIS port 302 being coupled to the third RF port 305 and the fourth RF port 306.

As also shown at step 602, in this example the first state comprises the first RF port 303 and the second RF port 304 being coupled to the first upstream DOCSIS port 307. Similarly, the third RF port 305 and the fourth RF port 306 are coupled to the second upstream DOCSIS port 308.

At step 603, client devices coupled to the RF ports 303,304,305,306 (such as the client devices shown in FIG. 2 were) perform their ranging and registration operations. At step 604, the client devices completing the ranging and registration process, i.e., those that are in communication with the head-end coupled to the DOCSIS ports, are identified. In one or more embodiments, step 604 comprises storing those identified client devices in a memory 610. While the memory 610 is shown as residing in the node 202 in FIG. 6, it should be noted that the memory 610, and the one or more control circuits 312 for that matter, can reside in the head-end that is coupled to the node 202 via a fiber optic network (215) or another electronic device in communication with either the head-end or the node 202. Other configurations and locations for the one or more control circuits 312 and the memory 610 will be obvious to those of ordinary skill in the art having the benefit of this disclosure.

Illustrating by example, in one or more embodiments the one or more control circuits 312 are operable in the DOCSIS MAC control plane. In one or more embodiments, this DOCSIS MAC control plane resizes in different devices as a function of the overall architecture of the system. For instance, in an ICCAP device, the DOCSIS MAC control plane is configured as one or more circuit cards situated within a chassis. In a CCAP core device, the DOCSIS MAC control plane is configured as one or more circuit cards situated within a chassis. In a virtualized core device, the DOCSIS MAC control plane can be configured as executable software constructions operating at the CCAP core. In a remote PHY system (200) like that shown in FIG. 2 above, the DOCSIS MAC control plane is configured as hardware within the node 202. Thus, while this illustrative embodiment is used for explanatory purposes, it should be noted that the one or more control circuits could reside outside the node 202, such as within the head-end or in another electronic device. The same is true with the downstream RF switching network 315 and the upstream RF switching network 315. While shown as being integrated within the node 202, they could be located outside the node 202 in the RF network (217) as well. Other equivalent configurations for these illustrative circuit components will be obvious to those of ordinary skill in the art having the benefit of this disclosure.

At step 605, the method 600 causes—in this example—the upstream RF switching network 315 to switch to a second state, which is shown in step 606. As shown in step 606, the second state switches RF port 304 and RF port 305. While RF port 303 is still in communication with the first upstream DOCSIS port 307, and while RF port 306 is still in communication with the second upstream DOCSIS port 308, the connections of RF port 304 and RF port 305 have changed. Rather than communicating with the first upstream DOCSIS port 307 as was the case with the upstream RF switching network 315 was in the first state, RF port 304 is now coupled to the second upstream DOCSIS port 308. In similar fashion, rather than communicating with the second upstream DOCSIS port 308 as was the case with the upstream RF switching network 315 was in the first state, in the second state RF port 304 is now coupled to the first upstream DOCSIS port 307.

This results in the client devices coupled to the first RF port 303 and the fourth RF port 306 being able to complete their ranging and registration processes due to the fact that they are still communicating with the same DOCSIS ports that they were in communication with when the upstream RF switching network 315 was in the first state. This is true because they are still receiving the correct upstream channel descriptor messages from the downstream communication. However, the client devices that are now communicating with different DOCSIS upstream ports are unable to complete their ranging and registration processes due to the fact that their upstream channel descriptor messages are inconsistent with the physical configuration of the upstream RF switching network 315.

At step 607, the one or more control circuits 312 of the node 202 determine which client devices are still identified as having completed the ranging and registration procedure. In one or more embodiments, the identities of these devices are recorded in memory 610 at step 607. In one or more embodiments, step 607 also comprises identifying and recording in memory client devices that are no longer in communication with the head-end.

Thus, by comparing the identities of the client devices recorded at step 604 with those recorded at step 607, the one or more control circuits 312 can begin to make identification associations between RF ports 303,304,305,306 and client devices. For example, if client device A and client device B are coupled to the first RF port 303, client device C and client device D are coupled to the second RF port 304, client device E and client device F are coupled to the third RF port 305, and client device G and client device H are coupled to the fourth RF port 306 when the upstream RF switching network 315 is in the first state, each of these client devices will be recorded at step 604. However, at step 607, only client devices A, B, G, and H will be recorded. The one or more control circuits 312 can then conclude that these client devices are coupled to either the first RF port 303 or the fourth RF port 306.

Performing repeating the process to perform another permutation allows for additional conclusions. For example, if the upstream RF switching network 315 is switched to a third state, the devices coupled to the first RF port 303 can be precisely identified. If the third state of the upstream RF switching network 315 switches RF port 304 and RF port 306, the one or more control circuits 312 would identify client devices A, B, E, and F. Moreover, the one or more control circuits 312 would know that RF ports 303,305 are still communicating with the same DOCSIS ports that they were in communication with when the upstream RF switching network 315 was in the first state. From this, by comparing these client devices with those identified at step 607, the one or more control circuits 312 could conclude, with certainty, that client device A and client device B are coupled to the first RF port 303. Since client device E and client device F are detected in the third state, they must be connected to the third RF port 305. Since client device G and client device H are no longer connected in the third state, they must be coupled to the fourth RF port 306. Since client device C and client device D have not been detected at this point, they can only be coupled to the second RF port 304. Thus, the one or more control circuits 312 acquire an accurate mapping of the network topology simply by changing the upstream RF switching network 315 between three states in this illustrative example. Decision 608 determines whether the appropriate number of combinations to obtain this network mapping has occurred. In the example of the preceding paragraphs, only three states of the upstream RF switching network 315 were required to map the four RF ports 303,304,305,306. This is despite the fact that the upstream RF switching network 315 can be switched into sixteen different states. In one or more embodiments, decision 608 comprises determining whether the minimum number of states has occurred to determine which client devices are coupled to which RF ports 303,304,305,306. In other embodiments, for completeness, decision 608 comprises determining whether all permutations of the states of the upstream RF switching network 315 have been completed to first identify, and then confirm by redundancy, which client devices are coupled to which RF ports 303,304,305,306. Step 609 then performs the comparison described in the immediately preceding paragraph to obtain the network mapping.

It is noted that the method 600 of FIG. 6 occurs when the various client devices are performing their ranging and registration process. While this method 600 works well in practice, it can cause network interruptions due to the fact that during the testing process certain client devices are precluded from completing the ranging and registration process. Accordingly, they must repeat the process to come back on-line when the testing process is complete.

Figure 7:
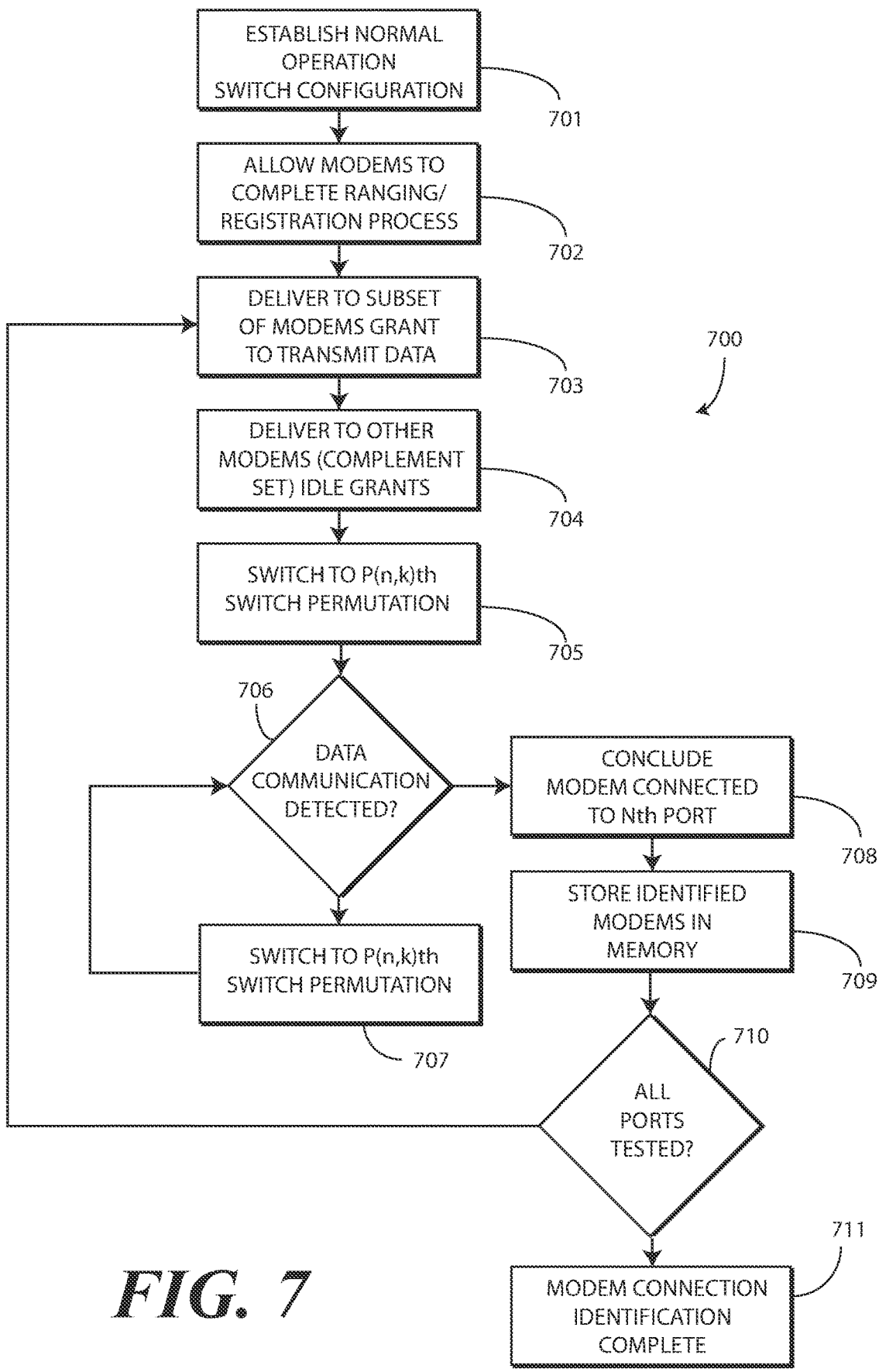
FIG. 7 illustrates another explanatory method in accordance with one or more embodiments of the disclosure.

To allow for the node to determine which client devices are coupled to which RF ports without any service disruption, in another embodiment some client devices are delivered idle grants, while other client devices are instructed to transmit data. The testing can then occur during these idle grants/data transmissions to allow a determination of which client devices are coupled to which RF ports without any service disruptions occurring. Turning now to FIG. 7, illustrated therein is one method 700 by which this process can occur.

As with the method (600) of FIG. 6, the method 700 of FIG. 7 can be performed by causing one or both of the downstream RF switching network (314) and/or the upstream RF switching network (315) to switch states. However, for ease of illustration the method 700 will also be described in the form of changing the state of only the upstream RF switching network (315). As before, other equivalents to the method 700 of FIG. 7 that include switching the downstream RF switching network (314) or combinations of the downstream RF switching network (314) and the upstream RF switching network (315) will be obvious to those of ordinary skill in the art having the benefit of this disclosure.

Beginning at step 701, the downstream RF switching network (314) and the upstream RF switching network (315) are switched to their default configuration. Each client device coupled to the RF ports (303,304,305,306) of the node then completes its ranging and registration process and begins communicating with the head-end coupled to the node (202) at step 702.

At step 703, a subset of client devices is instructed to transmit data during a test period. Examples of such instructions include causing the client devices coupled to the remaining RF port to deliver station maintenance, transmit DOCSIS code words (CW), transmit pilot transmission probes such as the D3.1 probe, and so forth. At step 704, remaining client devices are assigned idle grants during the test period.

At step 705, the method 700 switches the upstream RF switching network (315) to a different state from the default state. For example, in one or more embodiments step 705 comprises switching, with the one or more control circuits 312, the upstream RF switching network (315), which is situated between the RF ports (303,304,305,306) and a plurality of optical ports (e.g., the first upstream DOCSIS port 307 or the second upstream DOCSIS port 308) of the node (202), from a first state to a second state. In one or more embodiments, this second state causes one RF port to be connected to one DOCSIS port, while the remaining RF ports are coupled to another DOCSIS port. Decision 706 determines whether the burst receiver of the head-end coupled to the node (202) detects data.

If for some reason no client devices are detected as transmitting data, step 707 switches the upstream RF switching network (315) to a different state. Where the burst receiver of the head-end detects data, those client devices sending data are identified at step 708 as being connected to the RF port coupled to the selected DOCSIS port. Said differently, in one or more embodiments step 708 comprises identifying, with the one or more control circuits (312), one or more client devices that are delivering the data to a predefined optical port of the plurality of optical ports. This information is recorded in memory at step 709. Decision 710 determines whether all RF ports have been tested. Where they have not, the method 700 returns to step 703 where the upstream RF switching network (315) is switched to yet another state. Once all the RF ports have been tested, the test process ends at step 711 with all client devices being correctly and positively identified as being connected to specific RF ports. The method 700 can then be repeated, with other client devices receiving idle grants and other client devices being instructed to transmit data, and so forth.

Figure 8:
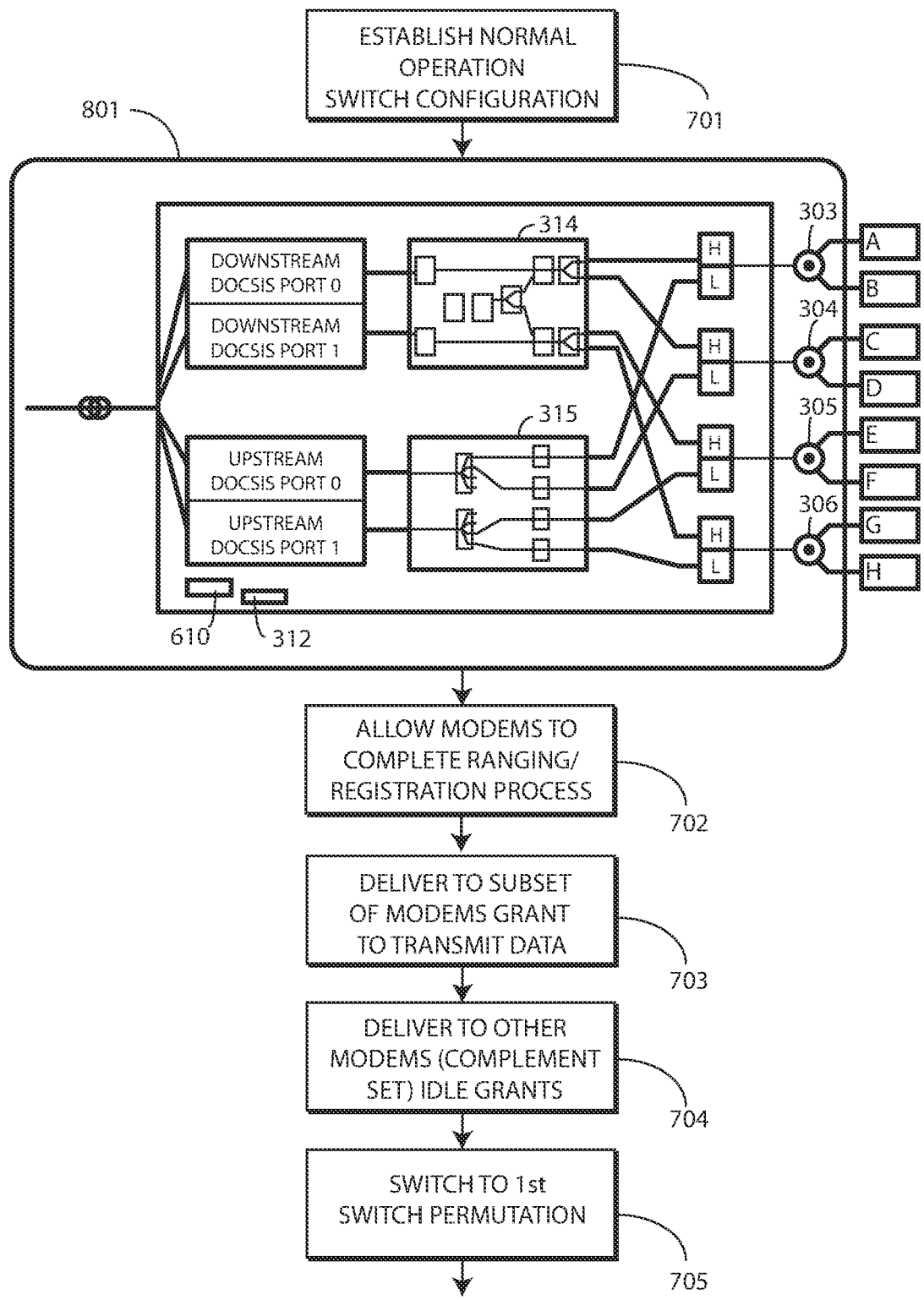
FIG. 8 illustrates one or more methods steps in accordance with one or more embodiments of the disclosure.

This method 700 is explained by example in FIGS. 8-12. Turning now to FIG. 8, at step 701 one or more control circuits 312 of a node 202 cause the downstream RF switching network 314 and the upstream RF switching network 315 to enter a first state, which is shown at step 801. In this illustrative example, the first state comprises the first downstream DOCSIS port 301 to be coupled to the first RF port 303 and the second RF port 304. In this illustrative example, the first state also comprises the second downstream DOCSIS port 302 being coupled to the third RF port 305 and the fourth RF port 306.

As also shown at step 801, in this example the first state comprises the first RF port 303 and the second RF port 304 being coupled to the first upstream DOCSIS port 307. Similarly, the third RF port 305 and the fourth RF port 306 are coupled to the second upstream DOCSIS port 308.

In this example, two client devices are coupled to each RF port 303,304,305,306. Client device A and client device B are coupled to RF port 303, while client device C and client device D are coupled to RF port 304. Client device E and client device F are coupled to RF port 305, while client device G and client device H are coupled to RF port 306.

At step 702, the client devices A,B,C,D,E,F,G,H coupled to the RF ports 303,304,305,306 perform their ranging and registration operations. In one or more embodiments, step 702 comprises identifying the client devices A,B,C,D,E,F,G,H completing the ranging and registration process. In one or more embodiments, step 702 comprises storing those identified client devices in a memory 610.

At step 703, a subset of the client devices is instructed to transmit data. For the purposes of illustration, in this example the subset of client devices comprises client device A, client device C, client device E, and client device G. At this point, the one or more control circuits 312 do not know to which RF ports 303,304,305,306 these client devices A,C,E,G are coupled.

At step 704, a complement of the subset of client devices is assigned idle grants. In this example, the complement of the subset of client devices A,C,E,G would include client device B, client device D, client device F, and client device H. Each would be assigned idle grants at step 705. At step 705, the one or more control circuits 312 switch the upstream RF switching network 315 to switch to a second state, which is shown in FIG. 9.

Figure 9:
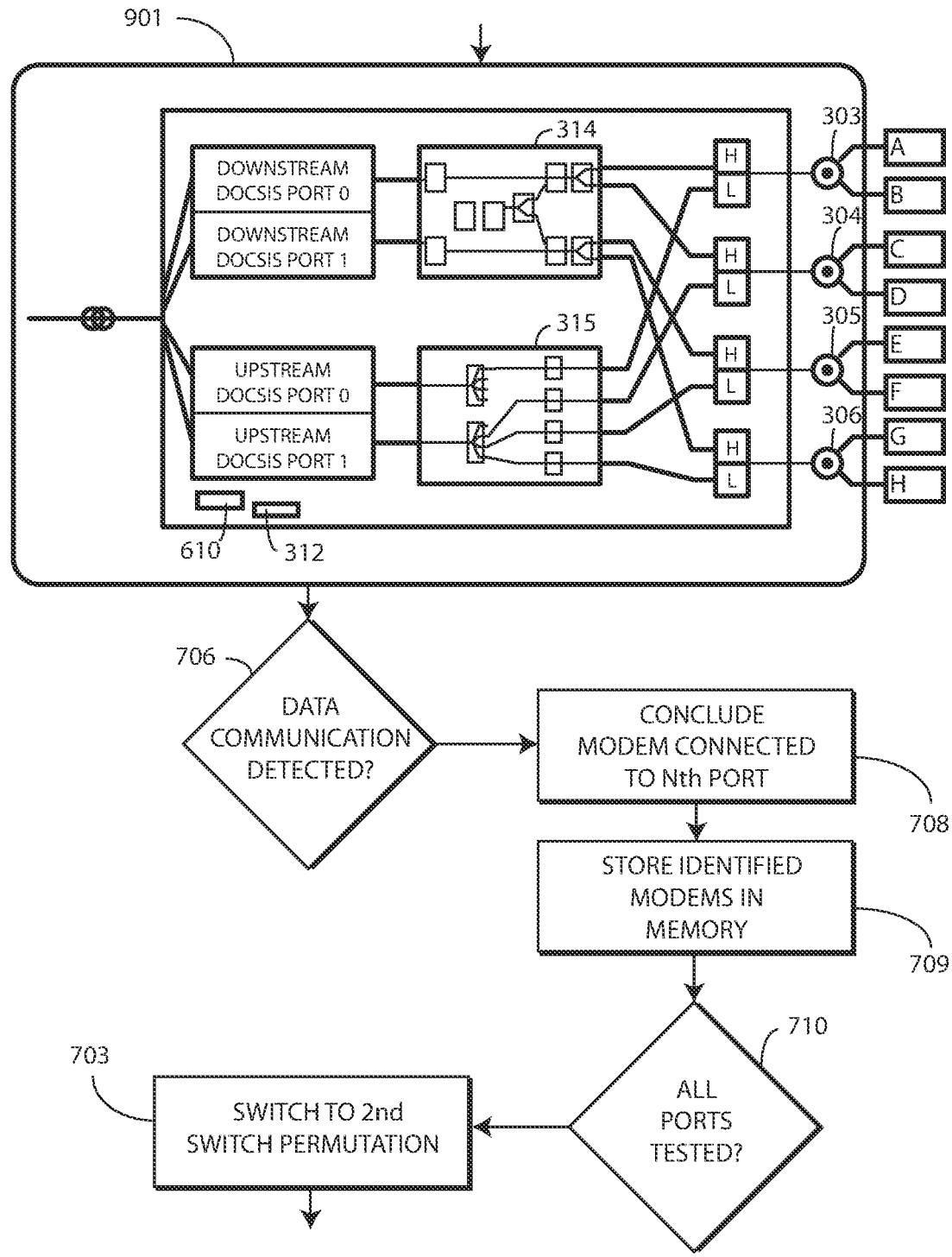
FIG. 9 illustrates one or more methods steps in accordance with one or more embodiments of the disclosure.

Turning now to FIG. 9, step 901 shows the second state of the upstream RF switching network 315 in this illustrative example. As shown in step 901, the second state leaves RF port 303 in communication with the first upstream DOCSIS port 307. While RF port 303 is still in communication with the first upstream DOCSIS port 307, the connections of RF port 304, RF port 305, and RF port 306 are now to the second upstream DOCSIS port 308. Thus, step 901 comprises coupling one RF port of the RF ports to a predefined optical port, which is the first upstream DOCSIS port 307 in this example. However, the remaining RF ports are coupled to another optical port, which is the second upstream DOCSIS port 308 in this example.

In one or more embodiments, decision 706 then comprises the burst receiver of the head-end coupled to the node 202 listening for data received at the first upstream DOCSIS port 307. Said differently, the burst receiver of the head-end determines which client devices of the plurality of client devices are delivering data to the first upstream DOCSIS port 307. In this example, client device A would be transmitting data to the first upstream DOCSIS port 307. Accordingly, step 708 would identify client device A being coupled to RF port 303, with that conclusion being recorded to memory 610 at step 709. Since client device B has been assigned an idle grant, it would not yet be identified as being coupled to RF port 303. Decision 710 determines whether all RF ports have been tested. In FIG. 9, they have not, as only the first RF port 303 has been tested. Accordingly, step 703 switches the upstream RF switching network 315 is switched to yet another state, which is shown in FIG. 10.

Figure 10:
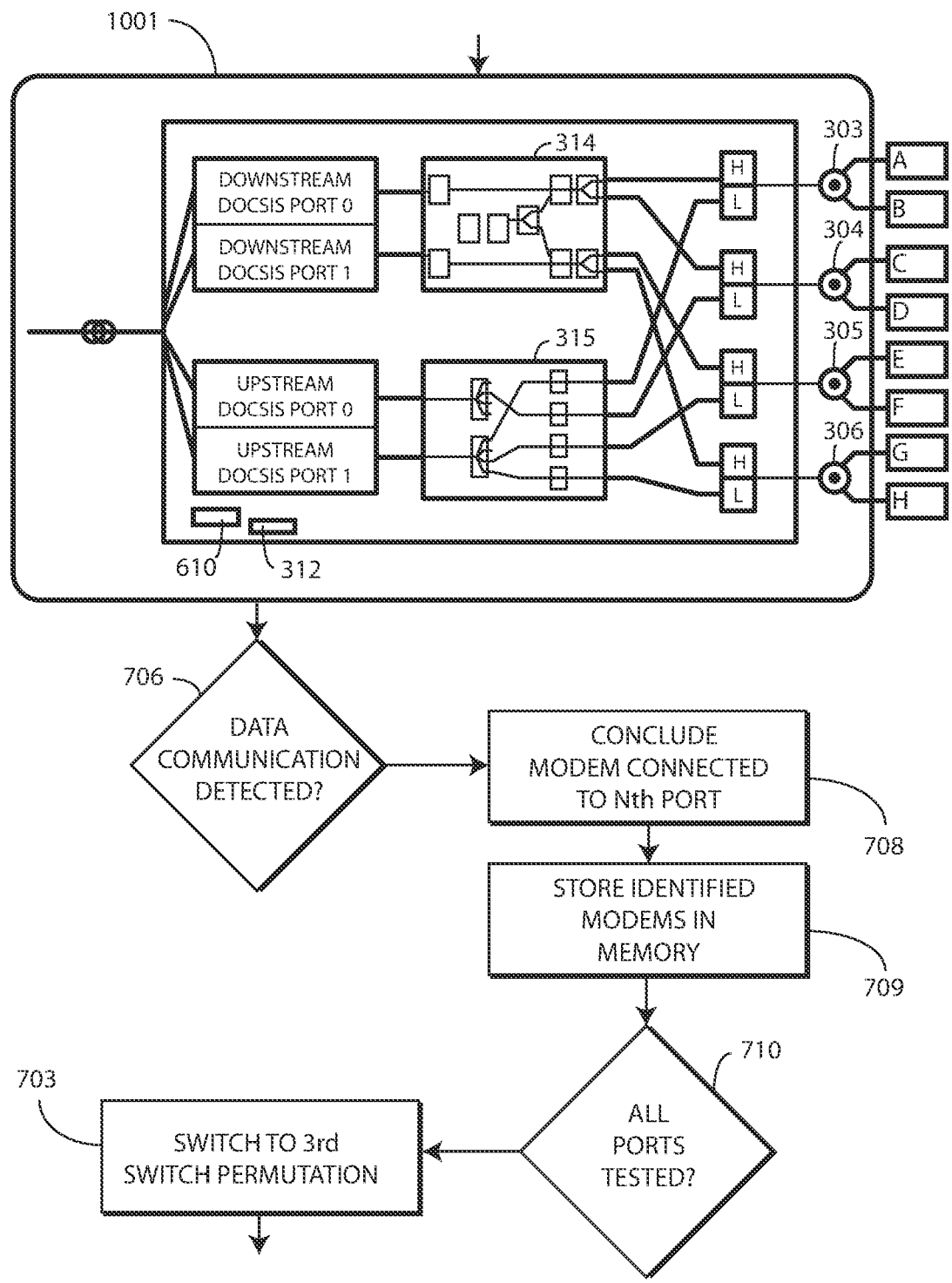
FIG. 10 illustrates one or more methods steps in accordance with one or more embodiments of the disclosure.

Turning now to FIG. 10, step 1001 shows the second state of the upstream RF switching network 315 in this illustrative example. As shown in step 1001, the second state puts RF port 304 in communication with the first upstream DOCSIS port 307. Meanwhile, the connections of RF port 303, RF port 305, and RF port 306 are now to the second upstream DOCSIS port 308.

In one or more embodiments, decision 706 then comprises the burst receiver of the head-end coupled to the node 202 listening for data received at the first upstream DOCSIS port 307. In this example, client device C would be transmitting data to the first upstream DOCSIS port 307. Accordingly, step 708 would identify client device C being coupled to RF port 304, with that conclusion being recorded to memory 610 at step 790. Since client device D has been assigned an idle grant, it would not yet be identified as being coupled to RF port 304. Thus, in this example step 708 comprises identifying, with the one or more control circuits, one or more other client devices of the some of the client devices that are delivering the data to the predefined optical port of the plurality of optical ports. Decision 710 again determines whether all RF ports have been tested. In FIG. 10, they have not, as only the first RF port 303 and the second RF port 304 has been tested. Accordingly, step 703 switches the upstream RF switching network 315 is switched to yet another state, which is shown in FIG. 11.

Figure 11:
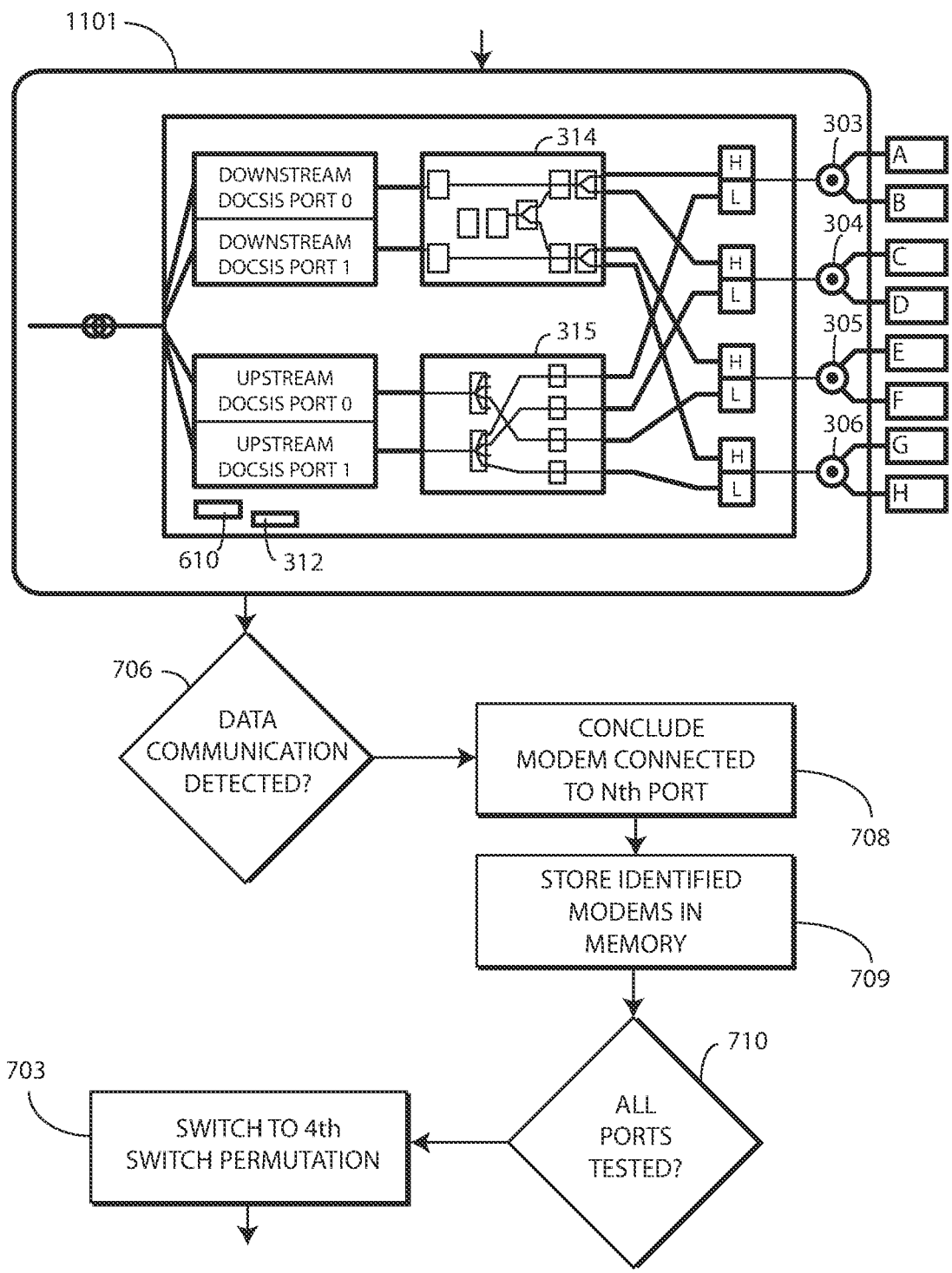
FIG. 11 illustrates one or more methods steps in accordance with one or more embodiments of the disclosure.

Turning now to FIG. 11, step 1101 shows the third state of the upstream RF switching network 315 in this illustrative example. As shown in step 1101, the third state puts RF port 305 in communication with the first upstream DOCSIS port 307. Meanwhile, the connections of RF port 303, RF port 304, and RF port 306 are now to the second upstream DOCSIS port 308.

In one or more embodiments, decision 706 then comprises the burst receiver of the head-end coupled to the node 202 listening for data received at the first upstream DOCSIS port 307. In this example, client device E would be transmitting data to the first upstream DOCSIS port 307. Accordingly, step 708 would identify client device E being coupled to RF port 305, with that conclusion being recorded to memory 610 at step 709. Since client device F has been assigned an idle grant, it would not yet be identified as being coupled to RF port 305. Decision 710 again determines whether all RF ports have been tested. In FIG. 11, only three RF ports 303,304,305 have been tested. Accordingly, step 703 switches the upstream RF switching network 315 is switched to yet another state, which is shown in FIG. 12.

Figure 12:
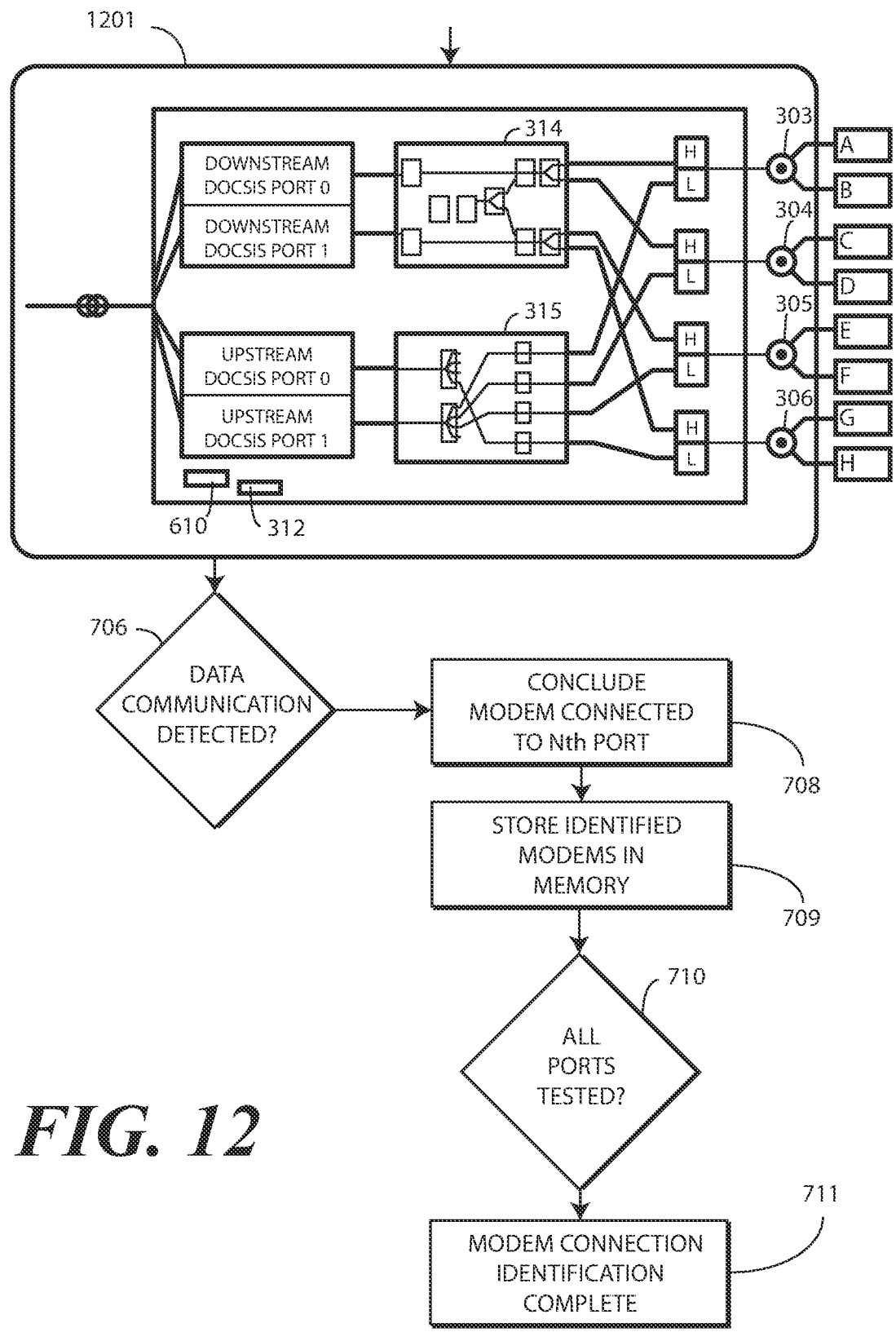
FIG. 12 illustrates one or more methods steps in accordance with one or more embodiments of the disclosure.

Turning now to FIG. 12, step 1201 shows the fourth state of the upstream RF switching network 315 in this illustrative example. As shown in step 1201, the fourth state puts RF port 306 in communication with the first upstream DOCSIS port 307. Meanwhile, the connections of RF port 303, RF port 304, and RF port 305 are now to the second upstream DOCSIS port 308.

In one or more embodiments, decision 706 then comprises the burst receiver of the head-end coupled to the node 202 listening for data received at the first upstream DOCSIS port 307. In this example, client device G would be transmitting data to the first upstream DOCSIS port 307. Accordingly, step 708 would identify client device E being coupled to RF port 306, with that conclusion being recorded to memory 610 at step 709. Since client device H has been assigned an idle grant, it would not yet be identified as being coupled to RF port 306.

Once all the RF ports have been tested, the test process ends at step 711 with all client devices being correctly and positively identified as being connected to specific RF ports. The method 700 can then be repeated, with other client devices receiving idle grants and other client devices being instructed to transmit data, and so forth. Illustrating by example, the method steps shown in FIGS. 8-12 could be repeated, this time with client device B, client device D, client device F, and client device H being instructed to transmit data, while client device A, client device C, client device E, and client device G are given idle grants.

In so doing, the burst receiver of the head-end can identify the RF port and corresponding RF leg to which the client devices are coupled. These tests can be performed periodically and/or staggered across time to periodically update the status of the system. They do not have to be performed for all client devices back-to-back, thereby increasing the probability that no service disruptions will occur.

Embodiments of the disclosure contemplate that node splits, node replacement, and other field operations will continue to occur as MSOs work to increase bandwidth in their RPD systems. Advantageously, embodiments of the disclosure provide a simple, effective, and low-cost tool to determine which client devices are served by which RF leg of an RF network. Embodiments of the disclosure also allow MSO operational groups to determine accurate event correlation of customers impacted by outages occurring on an RF leg. Moreover, embodiments of the disclosure allow MSOs to identify which RF leg coupled to an RF port of a RPD, RMD, or node is experiencing technical problems. Embodiments of the disclosure further allow MSOs to determine the number of client devices served by each RF leg so that they may rebalance service groups in the DOCSIS system.

Figure 13:
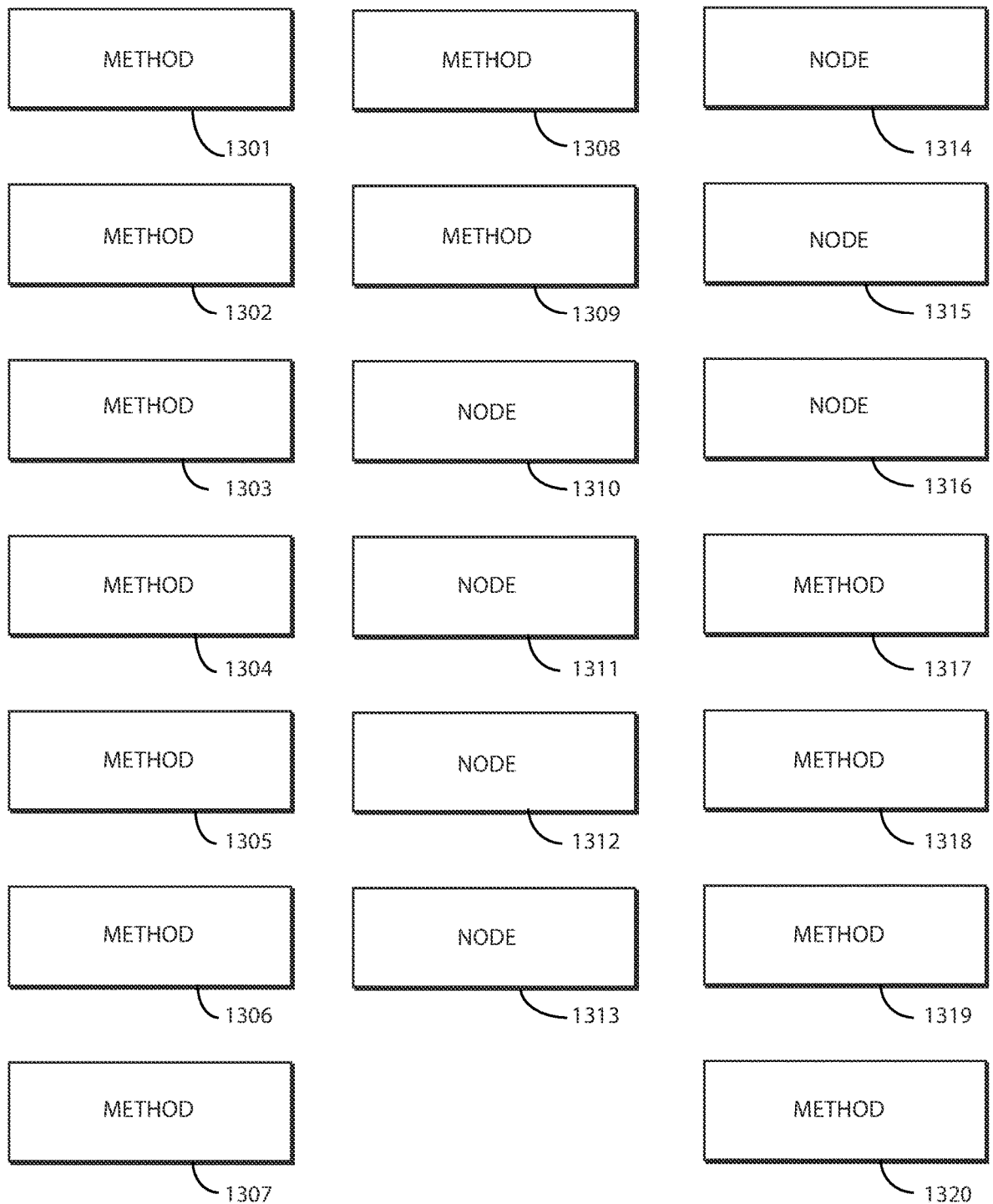
FIG. 13 illustrates various embodiments of the disclosure.

Turning now to FIG. 13, illustrated therein are various embodiments of the disclosure. At 1301, a method for identifying which client devices are coupled to which RF ports of a node comprises assigning, with one or more control circuits, some of the client devices instructions to transmit data. At 1301, the method comprises assigning, with the one or more control circuits, others of the client devices idle grants. At 1301, the method comprises switching, with the one or more control circuits, an RF switching network situated between the RF ports and a plurality of optical ports of the node from a first state to a second state. At 1301, the method comprises identifying, with the one or more control circuits, one or more client devices of the some of the client devices that are delivering the data to a predefined optical port of the plurality of optical ports.

At 1302, the RF switching network of 1301 comprises an upstream RF switching network. At 1302, the plurality of optical ports of 1301 comprises a plurality of upstream optical ports.

At 1303, the second state of 1301 couples one RF port of the RF ports to the predefined optical port. At 1304, the second state of 1303 couples remaining RF ports other than the one RF port to an optical port other than the predefined optical port. At 1305, the method of 1304 further comprises identifying, with the one or more control circuits, at least one client device as being coupled to the one RF port.

At 1306, the method of 1305 further comprises switching, with the one or more control circuits, the RF switching network from the second state to a third state. At 1306, the method comprises identifying, with the one or more control circuits, one or more other client devices of the some of the client devices that are delivering the data to the predefined optical port of the plurality of optical ports.

At 1307, the third state of 1306 couples another RF port of the RF ports to the predefined optical port. At 1308, the third state of 1307 couples RF ports other than the another RF port to an optical port other than the predefined optical port. At 1309, the method of 1308 further comprises identifying, with the one or more control circuits, the one or more other client devices as being coupled to the another RF port.

At 1310, a DOCSIS node comprises a first DOCSIS port and a second DOCSIS port. At 1310, the DOCSIS node comprises a plurality of radio frequency (RF) ports. At 1310, the DOCSIS port comprises an RF switching network coupled between the first DOCSIS port and the second DOCSIS port and the plurality of RF ports.

At 1311, the DOCSIS node of 1310 further comprises one or more control circuits. AT 1311, the one or more control circuits are configured to switch the RF switching network between at least a first state coupling a first RF port of the plurality of RF ports to the first DOCSIS port and a second RF port of the plurality of RF ports to the second DOCSIS port, and a second state coupling the first RF port of the plurality of RF ports to the second DOCSIS port and the second RF port of the plurality of RF ports to the first DOCSIS port.

At 1312, the one or more control circuits of 1311 are further configured to switch the RF switching network to a third state coupling a third RF port of the plurality of RF ports to the first DOCSIS port and the first RF port of the plurality of RF ports and the second RF port of the plurality of RF ports to the second DOCSIS port. At 1313, the one or more control circuits of 1312 are further configured to switch the RF switching network to a fourth state coupling a fourth RF port of the plurality of RF ports to the first DOCSIS port and the first RF port of the plurality of RF ports, the second RF port of the plurality of RF ports, and the third RF port of the plurality of RF ports to the second DOCSIS port.

At 1314, the first DOCSIS port and the second DOCSIS port of 1313 comprise upstream DOCSIS ports. At 1315, the DOCSIS node of 1313 further comprises a plurality of client devices coupled to the plurality of RF ports. At 1315, the one or more control circuits deliver idle grants to some client devices of the plurality of client devices and instructions to transmit data to other client devices of the plurality of client devices.

At 1316, the DOCSIS node of 1315 further comprises a head-end comprising a burst receiver coupled to the first DOCSIS port. At 1316, the burst receiver determines which client devices of the plurality of client devices are delivering the data to the first DOCSIS port when the RF switching network is in each of the first state, the second state, the third state, and the second state.

At 1317, a method for identifying which client devices are coupled to which RF ports of a node comprises switching, with one or more control circuits, an RF switching network situated between the RF ports and a plurality of optical ports of the node to a first state to a second state. At 1317, the method comprises identifying, with the one or more control circuits, a plurality of client devices coupled to the RF ports commencing a ranging and registration process.

At 1317, the method comprises switching, with the one or more control circuits, the RF switching network from the first state to a second state. At 1317, the method comprises identifying, with the one or more control circuits, a subset of the plurality of client devices continuing to perform the ranging and registration process.

At 1318, the method of 1317 further comprises associating, by the one or more control circuits, the subset of the plurality of client devices with at least one RF port of the RF ports when the RF switching network is in the second state. At 1319, the method of 1318 further comprises switching, with the one or more control circuits, the RF switching network from the second state to a third state. At 1319, the method comprises associating, by the one or more control circuits, at least some client devices from the subset of the plurality of client devices with a single RF port of the RF ports. At 1320, the method of 1319 further comprises switching, with the one or more control circuits, the RF switching network from the third state to the first state.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, when different RF ports on a RPD, RMD, or node, or alternatively on an upstream cable access module (UCAM), it becomes impossible in prior art systems to identify the RF port that connects to a particular client device. Advantageously, embodiments of the disclosure allow the precise identification of each client device coupled to each RF port of each RPD, RMD, or node. This identification can occur due to the operation of an RF switching network or networks that connect a burst receiver to different RF ports at different times in one or more embodiments. This switching, combined with the process of client device ranging and/or scheduling, can grant the target client device instructions to transmit data while other client devices are given idle grants to identify the RF port and RF leg mapping. Embodiments of the disclosure are therefore novel over prior art solutions due to their beneficially identifying the RF ports that host particular client devices. This can help in avoiding performing sounding in full duplex (FDX) operations, finding leg outages, providing recommendations on when to split an RF leg, and so forth. Other features and benefits will be obvious to those of ordinary skill in the art having the benefit of this disclosure.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A Data Over Cable Interface Specification (DOCSIS) node, comprising:
a first DOCSIS port;
a second DOCSIS port;
a plurality of radio frequency (RF) ports; and
an RF switching network coupled between the first DOCSIS port and the second DOCSIS port and the plurality of RF ports.

2. The DOCSIS node of claim 1, further comprising one or more control circuits configured to switch the RF switching network between at least a first state coupling a first RF port of the plurality of RF ports to the first DOC SIS port and a second RF port of the plurality of RF ports to the second DOCSIS port, and a second state coupling the first RF port of the plurality of RF ports to the second DOCSIS port and the second RF port of the plurality of RF ports to the first DOCSIS port.

3. The DOCSIS node of claim 2, the one or more control circuits further configured to switch the RF switching network to a third state coupling a third RF port of the plurality of RF ports to the first DOC SIS port and the first RF port of the plurality of RF ports and the second RF port of the plurality of RF ports to the second DOCSIS port.

4. The DOCSIS node of claim 3, the one or more control circuits further configured to switch the RF switching network to a fourth state coupling a fourth RF port of the plurality of RF ports to the first DOC SIS port and the first RF port of the plurality of RF ports, the second RF port of the plurality of RF ports, and the third RF port of the plurality of RF ports to the second DOCSIS port.

5. The DOCSIS node of claim 4, wherein each of the first DOCSIS port and the second DOCSIS port comprise upstream DOCSIS ports.

6. The DOCSIS node of claim 4, further comprising a plurality of client devices coupled to the plurality of RF ports, the one or more control circuits delivering idle grants to some client devices of the plurality of client devices and instructions to transmit data to other client devices of the plurality of client devices.

7. The DOCSIS node of claim 6, further comprising a head-end comprising a burst receiver coupled to the first DOCSIS port, the burst receiver determining which client devices of the plurality of client devices are delivering the data to the first DOC SIS port when the RF switching network is in each of the first state, the second state, the third state, and the second state.

* * * * *